(12) United States Patent
Song et al.

(10) Patent No.: US 12,175,704 B2
(45) Date of Patent: Dec. 24, 2024

(54) QUANTITATIVE ANALYSIS METHOD AND SYSTEM FOR ATTENTION BASED ON LINE-OF-SIGHT ESTIMATION NEURAL NETWORK

(71) Applicants: CHONGQING UNIVERSITY, Chongqing (CN); STAR INSTITUTE OF INTELLIGENT SYSTEMS, Chongqing (CN); DB (CHONGQING) INTELLIGENT TECHNOLOGY RESEARCH INSTITUTE CO., LTD., Chongqing (CN); UNIVERISTY OF ELECTRONIC SCIENCE AND TECHNOLOGY OF CHINA, Chengdu (CN)

(72) Inventors: Yongduan Song, Chongqing (CN); Feng Yang, Chengdu (CN); Rui Li, Chongqing (CN); Qin Chen, Chongqing (CN); Shichun Wang, Chongqing (CN); Hongyu Xia, Chongqing (CN); Caishi He, Chongqing (CN); Shihao Pu, Chongqing (CN)

(73) Assignees: Chongqing University, Star Institute of Intelligent Systems, DB (Chongqing) Intelligent Technology Research Institute Co., Ltd., Chongqing (CN); University of Electronic Science and Technology of China, Chongqing (CN)

( * ) Notice: Subject to any disclaimer, the term of this patent is extended or adjusted under 35 U.S.C. 154(b) by 366 days.

(21) Appl. No.: 17/681,510

(22) Filed: Feb. 25, 2022

(65) Prior Publication Data
US 2023/0025527 A1 Jan. 26, 2023

(30) Foreign Application Priority Data
Jul. 26, 2021 (CN) .......................... 202110848705.9

(51) Int. Cl.
*G06T 7/73* (2017.01)
*G06V 10/776* (2022.01)
(Continued)

(52) U.S. Cl.
CPC .............. *G06T 7/73* (2017.01); *G06V 10/776* (2022.01); *G06V 10/82* (2022.01); *G06V 40/171* (2022.01);
(Continued)

(58) Field of Classification Search
None
See application file for complete search history.

(56) References Cited

U.S. PATENT DOCUMENTS

| | | | |
|---|---|---|---|
| 2021/0395039 A1* | 12/2021 | Liu | G06V 40/161 |
| 2023/0025527 A1* | 1/2023 | Song | G06V 40/193 |

OTHER PUBLICATIONS

Zemblys R, Niehorster DC, Holmqvist K. gazeNet: End-to-end eye-movement event detection with deep neural networks. Behav Res Methods. Apr. 2019;51(2):840-864. doi: 10.3758/s13428-018-1133-5. PMID: 30334148.https://link.springer.com/article/10.3758/s13428-018-1133-5 (Year: 2019).*

* cited by examiner

*Primary Examiner* — Tahmina N Ansari
(74) *Attorney, Agent, or Firm* — Hunton Andrews Kurth LLP

(57) ABSTRACT

Embodiments of the present disclosure provide a quantitative method and system for attention based on a line-of-sight estimation neural network, which improves the stability and training efficiency of the line-of-sight estimation neural network. A few-sample learning method is applied to train-
(Continued)

ing of the line-of-sight estimation neural network, which improves generalization performance of the line-of-sight estimation neural network. A nonlinear division method for small intervals of angles of the line of sight is provided, which reduces an estimation error of the line-of-sight estimation neural network. Eye opening and closing detection is added to avoid the line-of-sight estimation error caused by an eye closing state. A method for solving a landing point of the line of sight is provided, which has high environmental adaptability and can be quickly used in actual deployment.

6 Claims, 8 Drawing Sheets

(51) Int. Cl.
   *G06V 10/82* (2022.01)
   *G06V 40/16* (2022.01)
   *G06V 40/18* (2022.01)
(52) U.S. Cl.
   CPC .... *G06V 40/18* (2022.01); *G06T 2207/20081* (2013.01); *G06T 2207/20084* (2013.01); *G06T 2207/30201* (2013.01)

QUANTITATIVE ANALYSIS METHOD AND SYSTEM FOR ATTENTION BASED ON LINE-OF-SIGHT ESTIMATION NEURAL NETWORK

CROSS REFERENCE TO RELATED APPLICATION

This patent application claims the benefit and priority of Chinese Patent Application No. 202110848705.9, filed on Jul. 26, 2021, the disclosure of which is incorporated by reference herein in its entirety as part of the present application.

TECHNICAL FIELD

The present disclosure relates to the technical field of artificial intelligence, and in particular to a quantitative analysis method and system for attention of students in class based on an end-to-end line-of-sight estimation neural network.

BACKGROUND ART

Attention analysis has important application value in assisted driving, automatic driving, human-computer interaction, advertising recommendation, behavior prediction, and psychological analysis. With the development of education, the application of attention analysis to the computer-aided system for classroom teaching has also attracted extensive attention.

The rapid development of online education has also exposed its shortcomings. It is difficult for teachers to know the learning status of the students in time and efficiently. Therefore, an attention analysis system is needed to assist teaching work.

In the existing computer-aided systems for classroom teaching, attention analysis is usually performed through the index of a head-down and head-up rate, and the head-down and head-up states of the students are determined by traditional image processing methods or machine learning methods. However, whether the head is down or up cannot directly reflect whether the students focus on listening to the class, such as writing with their heads down, looking around with their heads up, and sleeping with their heads up, which can easily lead to misjudgments.

SUMMARY

In order to solve the above technical problems, embodiments of the present disclosure provide a technical solution for quantitative analysis of attention and related neural network training based on a line-of-sight direction.

The technical solution of the present disclosure is a quantitative method for attention based on a line-of-sight estimation neural network, including:
step 1, calculating an attention area, where the attention area is an entire area requiring attention focusing of a target; fitting the attention area into one or more surfaces capable of being represented by equations, where the surfaces are called attention surfaces; and recording a mapping relationship between points on an actual object plane and the attention surfaces, where in the teaching field, the attention area is an entire teaching area including a blackboard, a platform, or multimedia;
step 2, obtaining an image of a detection area using a binocular camera, and locating a position of each face using a face detection method, where each face is a target for calculation of the attention;
step 3, correcting each target image and intercepting the target image;
step 3.1, calculating positions of key points on the target face, where the key points include: the corners of the eyes, the tip of the nose, and the corners of the mouth;
step 3.2, correcting the target using key point information, such that the corners of the eyes or the corners of the mouth of the target are on the same horizontal line; and recording a rotation angle of the target; and
step 3.3, rotating the image for each target, then intercepting the image of the target face, and scaling the intercepted image to a required size;
step 4, detecting eye opening and closing states of the target, and proceeding to step 5 when the eyes are open, where no subsequent calculation is performed when the eyes are closed;
step 5, calculating a line-of-sight direction of the target using the line-of-sight estimation neural network;
step 6, calculating a landing point of the line of sight of the target;
step 6.1, obtaining a positional relationship between the surface of the line of sight and the camera, and establishing a space rectangular coordinate system with a main camera in the binocular camera as a reference;
step 6.2, according to the rotation angle of the target image recorded in step 3.2, rotating the line-of-sight direction of the target obtained in step 5 back to normal;
step 6.3, according to a line-of-sight direction back to normal obtained in step 6.2, calculating yaw and pitch angles of the line of sight in the space rectangular coordinate system established in step 6.1;
step 6.4, calculating a distance between the target and the main camera according to a binocular imaging principle, and then calculating coordinates of the target in the space rectangular coordinate system; and calculating an intersection of the line of sight and the surface of the line of sight according to the coordinates and the angles of the line of sight in step 6.3; and
step 6.5, mapping the intersection back to the point on the plane to obtain the landing point of the line of sight; and
step 7, quantizing the attention:
dividing the attention surfaces, and setting an attention weight of each area according to area characteristics, where the area outside the attention surfaces has a weight of 0; assigning the target an attention value according to the landing point of the line of sight of the target; obtaining multiple attention values of the target correspondingly after the target images are acquired multiple times at an interval to form an attention value sequence, where the attention value sequence is a quantized attention value sequence.

Further, the line-of-sight estimation neural network in step 5 may include: a feature extraction backbone network, a fully connected layer for small interval classification of the yaw angle, a fully connected layer for small interval classification of the pitch angle, a fully connected layer for yaw angle regression, a fully connected layer for pitch angle regression, and a fully connected layer for eye opening and closing detection branches. The feature extraction backbone network may have an input of the target image, and an output of extracted features, and extracted features may be respectively input to the fully connected layer for small interval classification of the yaw angle, the fully connected layer for small interval classification of the pitch angle, and the fully connected layer for eye opening and closing detection branches. Outputs of the fully connected layer for small interval classification of the yaw angle, and the fully connected layer for small interval classification of the pitch angle may be correspondingly input to the fully connected layer for yaw angle regression and the fully connected layer for pitch angle regression. Outputs of the fully connected layer for yaw angle regression, the fully connected layer for pitch angle regression, and the fully connected layer for eye opening and closing detection branches may be respectively an estimated yaw angle, an estimated pitch angle, and eye opening and closing detection results.

Further, in the line-of-sight estimation neural network, each unit in the fully connected layer for yaw angle regression may represent a small interval of the angle after yaw angle division, and each unit in the fully connected layer for pitch angle regression may represent a small interval of the angle after pitch angle division. A method for the division may be as follows: making the small intervals denser when the rotation angle of the line of sight is smaller, and making the small intervals sparser when the rotation angle of the line of sight is larger.

Further, the small interval division may be symmetrical division, and a calculation function of division points may be:

$$P_i = \text{sign}(i)\left(1 - \cos\left(i\frac{l_\theta}{K}\right)\right)\frac{\frac{l_\theta}{2}}{1 - \cos\left(\frac{l_\theta}{2}\right)}, \left(i = -\frac{K}{2}, -\frac{K}{2}+1, \ldots, \frac{K}{2}\right).$$

$P_i$ represents a position of a i-th division point, sign( ) is a sign function, $l_\theta$ is a length of a symmetrical interval of the rotation angle, and K represents the number of the small intervals.

Further, a method for training the line-of-sight estimation neural network may include the following steps:

step 202, freezing weight parameters of the fully connected layer for yaw angle regression and the fully connected layer for pitch angle regression in the line-of-sight estimation neural network, such that these weight parameters are not updated and adjusted during network training, and the line-of-sight estimation neural network enters a classification training state;

step 204, obtaining line-of-sight direction estimation information of each sample image in a line-of-sight dataset using the line-of-sight estimation neural network in the classification training state;

step 206, calculating a classification loss part and a regression loss part according to the line-of-sight direction estimation information and line-of-sight direction annotation information, and calculating a line-of-sight estimation loss function value by weighting a loss function;

step 208, since the line-of-sight dataset is divided into a training part and a verification part with no intersection with the training part, estimating images in the verification part in the dataset using the line-of-sight estimation neural network in the classification training state, and calculating performance parameters of the line-of-sight estimation neural network using the corresponding annotation information;

step 210, determining whether the line-of-sight estimation neural network meets performance requirements of a first training stage, if not, proceeding to step 212, and if yes, proceeding to step 214;

step 212, updating and adjusting unfrozen weight parameters of the line-of-sight estimation neural network according to the line-of-sight estimation loss function value, and continuing to return to step 204 for iterative operations;

step 214, adjusting an anchor point value of the small interval of the angle, where values of the weight parameters of the fully connected layer for yaw angle regression and the fully connected layer for pitch angle regression may be the anchor point values of the corresponding small interval of the angle, and an initialization anchor point value may be a median value of each small interval of the angle of the line of sight; and freezing all weight parameters other than the weight parameters of the fully connected layer for yaw angle regression and the fully connected layer for pitch angle regression, such that the line-of-sight estimation neural network enters a regression training state;

step 216, obtaining line-of-sight direction estimation information of each sample image in the line-of-sight dataset using the line-of-sight estimation neural network in the regression training state, where the line-of-sight direction estimation information may contain classification estimation information and estimated angle outputs of the small intervals of the yaw and pitch angles of the line of sight;

step 218, calculating a classification loss part and a regression loss part according to the line-of-sight direction estimation information and line-of-sight direction annotation information, and calculating a line-of-sight estimation loss function value by weighting a loss function;

step 220, estimating images in the verification part in the dataset using the line-of-sight estimation neural network in the regression training state, and calculating performance parameters of the line-of-sight estimation neural network using the corresponding annotation information;

step 222, determining whether the line-of-sight estimation neural network meets performance requirements of a second training stage, if not, proceeding to step 224, and if yes, proceeding to step 226;

step 224, updating and adjusting the unfrozen weight parameters of the line-of-sight estimation neural network according to the line-of-sight estimation loss function value, and continuing to return to step 216 for iterative operations; and step 226, ending supervised training of the line-of-sight estimation neural network.

Further, the method for training the line-of-sight estimation neural network may include the following steps:

step 302, dividing the line-of-sight estimation dataset into a plurality of small datasets with no intersection, where the non-intersection may mean that any two small datasets do not contain the same element;

step 304, taking a small dataset, where the small dataset may contain a training part and a testing part; and recording the weight parameters of the line-of-sight estimation neural network as Φ, expressing the line-of-sight estimation neural network as $M_\Phi$, and duplicating $M_\Phi$ to obtain a duplicated line-of-sight estimation neural network $M_\Theta$, where Θ=Φ;

step 306, sampling at least one sample image from the training part of the small dataset, and obtaining line-of-sight direction estimation information of the sample using the duplicated line-of-sight estimation neural network $M_\Theta$;

step 308, calculating a line-of-sight estimation loss function value according to the line-of-sight direction estimation information and corresponding line-of-sight annotation information;

step 310, training and adjusting weight parameters Θ of the duplicated line-of-sight estimation neural network based on the line-of-sight estimation loss function value;

step 312, determining whether specified training times conditions are reached, if not, returning to step 306, and if yes, executing step 314;

step 314, recording the line-of-sight estimation neural network trained and adjusted by an inner training cycle as $M_{\Theta'}$, sampling at least one sample image from the testing part of the small dataset, and obtaining line-of-sight direction estimation information of the sample using $M_{\Theta'}$;

step 316, calculating a line-of-sight estimation loss function value according to the line-of-sight direction estimation information and corresponding line-of-sight annotation information;

step 318, training and adjusting the weight parameters Φ of the duplicated line-of-sight estimation neural network $M_\Phi$ based on the line-of-sight estimation loss function value;

step 320, determining whether performance of the line-of-sight estimation neural network meets ending conditions of few-sample learning and training, if not, returning to step 304, and if yes, proceeding to step 322; and step 322, ending the few-sample training of the line-of-sight estimation neural network.

A system for the quantitative method for attention based on a line-of-sight estimation neural network includes:

the binocular camera, configured to obtain the image of the target area;

a face obtaining module, configured to detect the face in the image and correct the face;

a line-of-sight estimation module, configured to calculate the line-of-sight direction and the eye opening and closing states of the target;

a viewpoint solving module, configured to calculate the landing point of the line of sight of the target in the attention area;

an attention quantization module, configured to calculate an attention quantization value;

an attention analysis module, configured to correct attention misjudgments, and also count, conclude, and summarize attention information; and an attention interaction module, configured to display the attention information of the target to the user, and set and modify various parameters of the system, where the face obtaining module includes: a face detection submodule, a face correction submodule, and an image preprocessing submodule; the line-of-sight estimation module includes: an eye opening and closing detection submodule, and a line-of-sight estimation submodule; the attention analysis module includes: an attention value correction submodule and an attention statistics submodule; and the attention interaction module includes: an attention display submodule and a parameter adjustment submodule; and the image obtained by the binocular camera is transmitted to the face detection submodule, an output of the face obtaining module is respectively input to the eye opening and closing detection submodule, the line-of-sight estimation submodule, and the viewpoint solving module, and an output of the eye opening and closing detection submodule is input to the line-of-sight estimation submodule; and an output of the line-of-sight estimation module is input to the viewpoint solving module, an output of the viewpoint solving module is input to the attention quantization module, and then data is successively transmitted in the following order: the attention value correction submodule, the attention statistics submodule, and the attention display submodule.

According to the present disclosure, the attention information of the corresponding target can be provided to the customer according to the attention value of the target in the obtained image.

DETAILED DESCRIPTION OF THE EMBODIMENTS

The technical details of embodiments of the present disclosure will now be described in detail with reference to the accompanying drawings.

Figure 1:
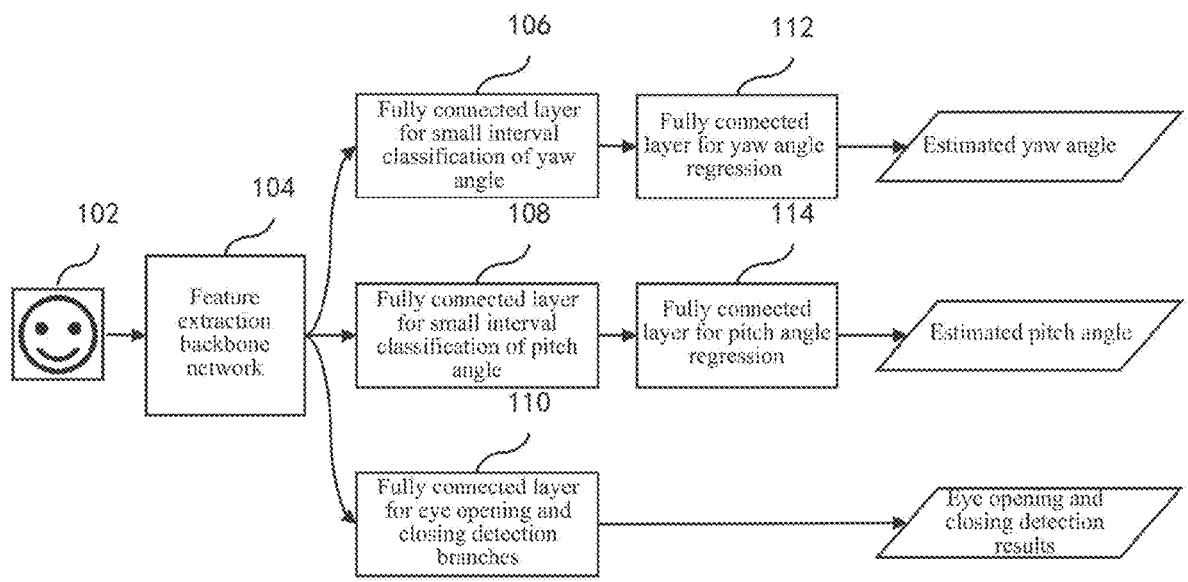
FIG. 1 is a structural block diagram of an embodiment of an end-to-end line-of-sight estimation neural network according to the present disclosure.

FIG. 1 is a structural block diagram of an embodiment of an end-to-end line-of-sight estimation neural network according to the present disclosure. As shown in FIG. 1, the end-to-end line-of-sight estimation neural network includes the following items.

102 is a preprocessed face image of a line-of-sight estimation target with the corners of the eyes or the corners of the mouth on the same horizontal line.

104 is a feature extraction backbone convolutional neural network, configured to extract a feature vector of the input image.

106 is a fully connected layer for small interval classification of the yaw angle, having an output dimension of the number of small intervals of the yaw angle, and configured to obtain the possibility that an estimated yaw angle belongs to each small interval. Similarly, 108 is a fully connected layer for small interval classification of the pitch angle.

110 is a fully connected layer for eye opening and closing detection branches, configured to obtain eye opening and closing states of the input image from the feature vector.

112 is a fully connected layer for yaw angle regression, having an input dimension of the number of small intervals of the yaw angle, an output dimension of 1, and an initialization value of a median value of each small interval of the yaw angle, and configured to obtain the estimated yaw angle of the line of sight. Similarly, 114 is a fully connected layer for pitch angle regression.

The network outputs the line-of-sight direction and the eye opening and closing states by directly taking the face image as the input without cropping the input of the eye image, and is end-to-end.

Figure 2:
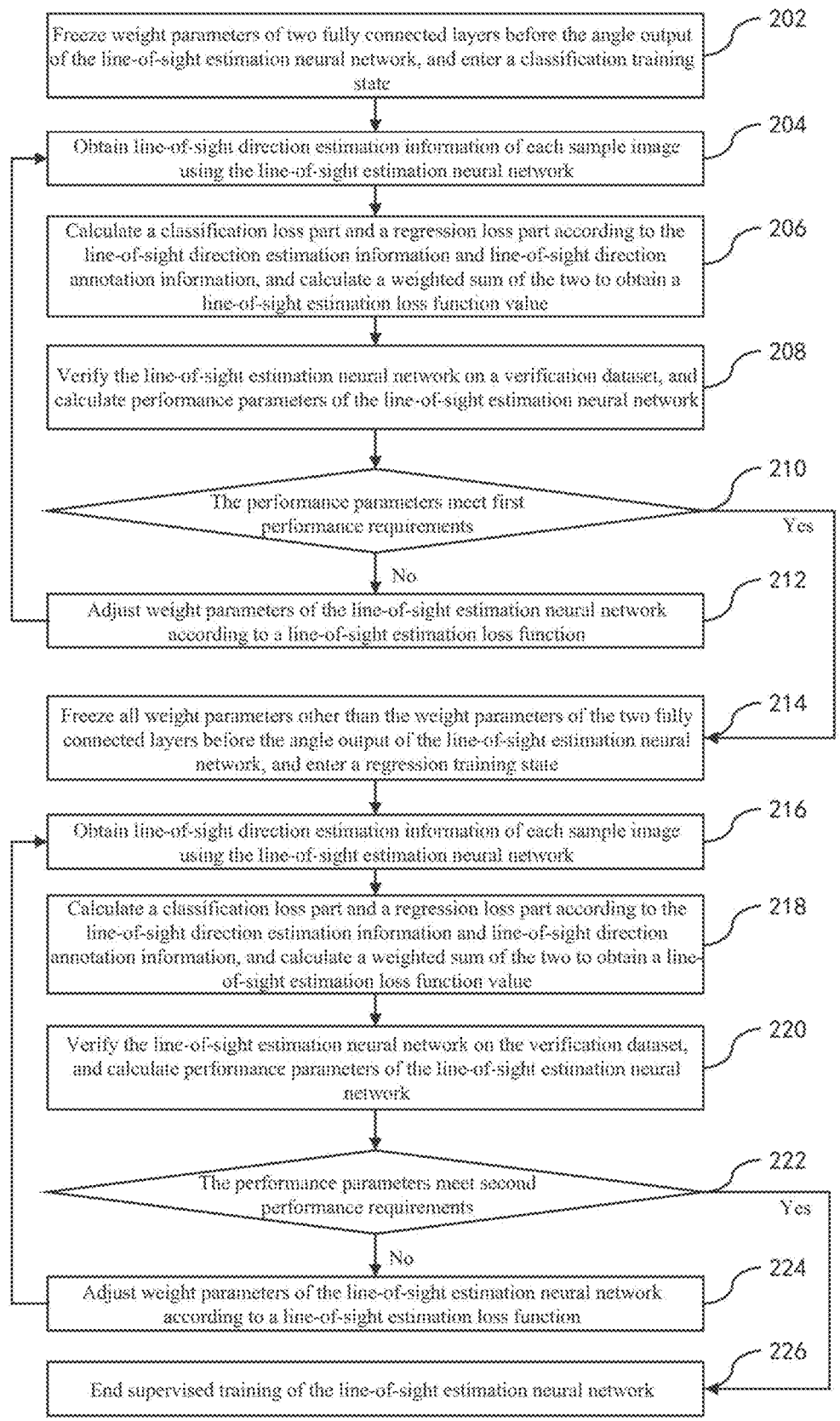
FIG. 2 is a flow chart of an embodiment of a supervised learning training method for the line-of-sight estimation neural network according to the present disclosure.

FIG. 2 is a flow chart of an embodiment of a method for training the line-of-sight estimation neural network according to the present disclosure, and is composed of two-step freezing training stages. As shown in FIG. 2, the method includes the following steps.

202, weight parameters of two fully connected layers before the angle output of the line-of-sight estimation neural network are frozen, such that these weight parameters are not updated and adjusted during network training. A specific implementation method is to set the derivation attribute of the weight parameter to No.

After the weight parameters of the two fully connected layers before the angle output are frozen, the training of the line-of-sight estimation neural network mainly includes training of its ability of classifying small intervals of the angle, so this state is called a classification training state.

204, line-of-sight direction estimation information of each sample image in a line-of-sight dataset is obtained using the line-of-sight estimation neural network in the classification training state. The line-of-sight direction estimation information contains classification estimation information and estimated angle outputs of the small intervals of the yaw and pitch angles of the line of sight.

The classification estimation information of the small intervals of the yaw and pitch angles of the line of sight is respectively recorded as:

$\hat{R}_{yaw} = \{\hat{r}_y^{(0)}, \hat{r}_y^{(1)}, \ldots, \hat{r}_y^{(M-1)}\}$, and $\hat{R}_{pitch} = \{\hat{r}_p^{(0)}, \hat{r}_p^{(1)}, \ldots, \hat{r}_p^{(N-1)}\}$.

$\hat{r}_y^{(i)}$ represents the possibility that the yaw angle of the line of sight estimated by the line-of-sight estimation neural network belongs to a i-th small interval, $\hat{r}_p^{(j)}$ represents the possibility that the pitch angle of the line of sight estimated by the line-of-sight estimation neural network belongs to a j-th small interval, M and N respectively represent the number of small intervals of the yaw and pitch angles of the line of sight, and the corresponding classification and annotation information of the small interval of the angle of the line of sight is expressed as $R_{yaw}$ and $R_{pitch}$.

The estimation information of the angle of the line of sight is recorded as $\hat{g} = (\hat{\theta}, \hat{\varphi})$, a corresponding annotated value of the angle of the line of sight is $g = (\theta, \varphi)$, $\hat{\theta}$ and $\hat{\varphi}$ respectively represent the estimated yaw and pitch angles.

$\hat{\theta}$ is obtained by the following formula in the line-of-sight estimation neural network:

$\hat{\theta} = \sum_{i=0}^{M-1} \hat{r}_y^{(i)} a_y^{(i)}$.

$a_y^{(i)}$ is an anchor point value of a i-th small interval, and is taken as the median value of the small interval during initialization, and a calculation method for $\hat{\varphi}$ is similar.

206, a classification loss part $L_C(\hat{R}_{yaw}, R_{yaw}, \hat{R}_{pitch}, R_{pitch})$ and a regression loss part $L_R(\hat{\theta}, \theta, \hat{\varphi}, \varphi)$ are calculated according to the line-of-sight direction estimation information and line-of-sight direction annotation information, and a line-of-sight estimation loss function value is calculated by weighting a loss function $L = L_C + \lambda_1 L_R$.

Optionally, a cross entropy loss function may be selected as the loss function of the classification loss part, and a mean square error function may be selected as the loss function of the regression loss part.

208, since the line-of-sight dataset is divided into a training part and a verification part with no intersection with the training part, images in the verification part in the dataset are estimated using the line-of-sight estimation neural network in the classification training state, and performance parameters of the line-of-sight estimation neural network are calculated using the corresponding annotation information.

Optionally, the performance parameters include an average error of the estimated angle, the estimation classification accuracy of the small interval of the angle, and the variance of the estimated angle.

210, whether the line-of-sight estimation neural network meets performance requirements of a first training stage is determined.

212, in response to performance parameters of the line-of-sight estimation neural network not meeting the performance requirements of the first training stage, unfrozen weight parameters of the line-of-sight estimation neural network are updated and adjusted according to the line-of-sight estimation loss function value, and the method continues to return to step 104 for iterative operations.

214, in response to the performance parameters of the line-of-sight estimation neural network meeting the performance requirements of the first training stage, which means that the ability for classifying the small interval of the angle of the line-of-sight estimation neural network has reached the requirements, next, an anchor point value of the small interval of the angle needs to be adjusted. Values of the weight parameters of the two fully connected layers before the angle output of the line-of-sight estimation neural network are the anchor point values of the corresponding small interval of the angle, and an initialization anchor point value is a median value of each small interval of the angle of the line of sight. All weight parameters other than the weight parameters of the two fully connected layers before the angle output of the line-of-sight estimation neural network are frozen, such that the line-of-sight estimation neural network enters a regression training state.

216, line-of-sight direction estimation information of each sample image in the line-of-sight dataset is obtained using the line-of-sight estimation neural network in the regression training state. The line-of-sight direction estimation information contains classification estimation information and estimated angle outputs of the small intervals of the yaw and pitch angles of the line of sight.

218, a classification loss part $L_C(\hat{R}_{yaw}, R_{yaw}, \hat{R}_{pitch}, R_{pitch})$ and a regression loss part $L_R(\hat{\theta}, \theta, \hat{\varphi}, \varphi)$ are calculated according to the line-of-sight direction estimation information and line-of-sight direction annotation information, and a line-of-sight estimation loss function value is calculated by weighting a loss function $L = L_C + \lambda_1 L_R$.

220, images in the verification part in the dataset are estimated using the line-of-sight estimation neural network in the regression training state, and performance parameters of the line-of-sight estimation neural network are calculated using the corresponding annotation information.

222, whether the line-of-sight estimation neural network meets performance requirements of a second training stage is determined.

224, in response to the performance parameters of the line-of-sight estimation neural network not meeting the performance requirements of the second training stage, the unfrozen weight parameters of the line-of-sight estimation neural network are updated and adjusted according to the line-of-sight estimation loss function value, and the method continues to return to step 216 for iterative operations.

226, in response to the performance parameters of the line-of-sight estimation neural network meeting the performance requirements of the second training stage, a supervised training stage of the line-of-sight estimation neural network is ended.

Figure 3:
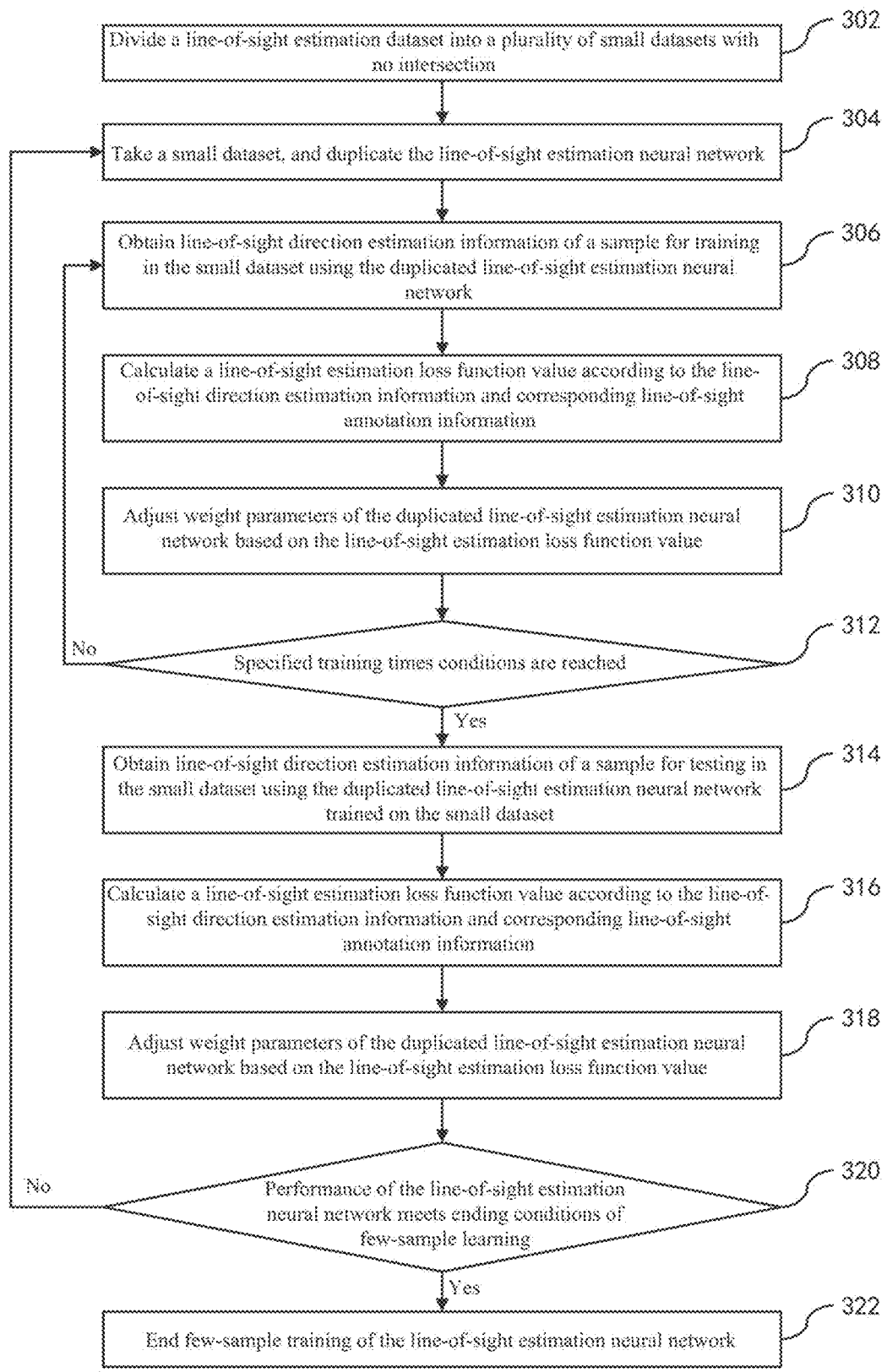
FIG. 3 is a flow chart of an embodiment of a few-sample learning and training method for the line-of-sight estimation neural network according to the present disclosure.

FIG. 3 is a flow chart of an embodiment of a few-sample learning and training method for the line-of-sight estimation neural network according to the present disclosure. As shown in FIG. 3, the method includes the following steps.

302, the line-of-sight estimation dataset is divided into a plurality of small datasets with no intersection. The non-intersection means that any two small datasets do not contain the same element.

304, a small dataset is taken. The small dataset contains a training part and a testing part. The weight parameters of the line-of-sight estimation neural network are recorded as $\Phi$, the line-of-sight estimation neural network is recorded as $M_\Phi$, and $M_\Phi$ is duplicated to obtain a duplicated line-of-sight estimation neural network $M_\Theta$. $\Theta=\Phi$.

306, at least one sample image is sampled from the training part of the small dataset, and line-of-sight direction estimation information of the sample is obtained using the duplicated line-of-sight estimation neural network $M_\Theta$.

308, a line-of-sight estimation loss function value is calculated according to the line-of-sight direction estimation information and corresponding line-of-sight annotation information.

310, weight parameters $\Theta$ of the duplicated line-of-sight estimation neural network are trained and adjusted based on the line-of-sight estimation loss function value.

312, whether specified training times conditions are reached is determined.

Optionally, the training times conditions are specifically whether the specified number of sampling periods is reached.

In response to a condition that the specified training times conditions are not reached, operations from 206 to 212 are iteratively executed, and this iterative execution process may be referred to as an inner training cycle.

314, in response to a condition that the specified training times conditions are reached, the line-of-sight estimation neural network trained and adjusted by the inner training cycle is recorded as $M_{\Theta'}$, at least one sample image is sampled from the testing part of the small dataset, and line-of-sight direction estimation information of the sample is obtained using $M_{\Theta'}$.

316, a line-of-sight estimation loss function value is calculated according to the line-of-sight direction estimation information and corresponding line-of-sight annotation information.

318, the weight parameters t of the duplicated line-of-sight estimation neural network $M_\Phi$ are trained and adjusted based on the line-of-sight estimation loss function value.

Optionally, when the weight parameters t of the duplicated line-of-sight estimation neural network are trained and adjusted based on the line-of-sight estimation loss function value, a first-order approximation can be used to reduce the amount of computation to improve the training speed.

320, whether performance of the line-of-sight estimation neural network meets ending conditions of few-sample learning and training is determined.

The generalization performance of the line-of-sight estimation neural network is focused on, that is, whether the line-of-sight estimation neural network can obtain relatively accurate results when line-of-sight estimation is performed on samples that have never been learned before. Optionally, the performance parameters include the mean error of the estimated angle of the line of sight on each small data and the estimation classification accuracy of the small interval of the angle of the line of sight.

In response to the performance of the line-of-sight estimation neural network not meeting the ending conditions of the few-sample learning and training, operations from 304 to 320 are iteratively executed, and this iterative execution process may be referred to as an outer training cycle.

In response to the performance of the line-of-sight estimation neural network meeting the ending conditions of the few-sample learning and training, the training is ended.

The division method for small intervals of angles of the line of sight affects the overall performance of the line-of-sight estimation neural network. Too many small intervals will lead to too large network parameters and too small class spacing, which is difficult to distinguish. Too few small intervals will lead to too large estimation error. A common division method is to determine an appropriate length of the small interval (such as 3 degrees) and then divide it evenly. However, it is observed that the change of the face appearance is small when the angle of the line of sight is small, the change of the face appearance is large when the angle of the line of sight is large, and the change trend is roughly inversely correlated with the absolute value of the derivative value of the cosine function of the angle of the line of sight.

Figure 4:
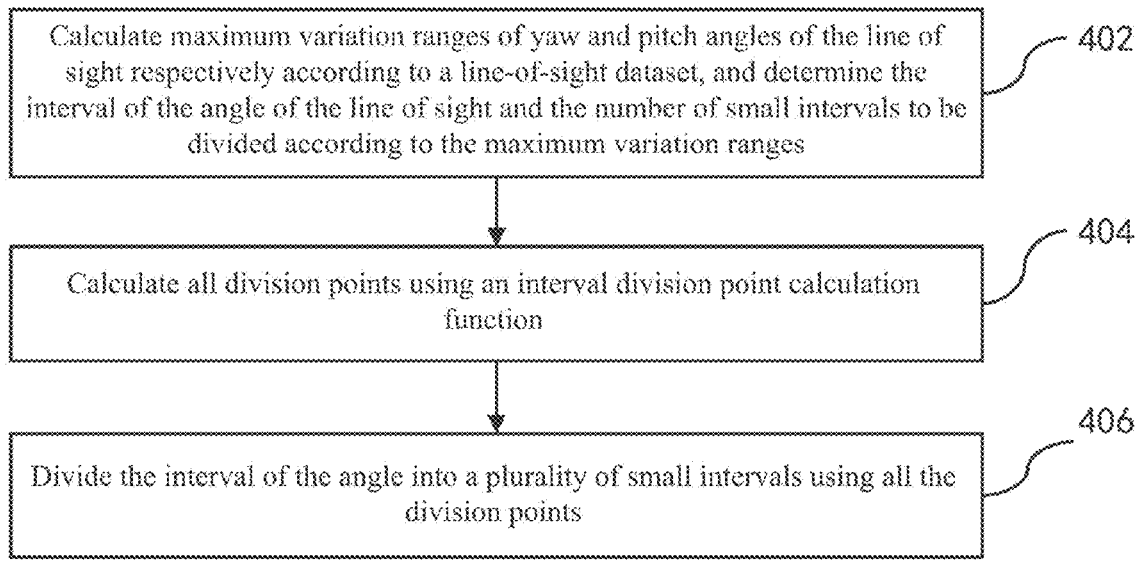
FIG. 4 is a flow chart of an embodiment of a nonlinear division method for small intervals of angles of the line of sight according to the present disclosure.

FIG. 4 is a flow chart of an embodiment of a method for small intervals of angles of the line of sight according to the present disclosure. As shown in FIG. 4, the method includes the following steps.

402, maximum variation ranges of the yaw and pitch angles of the line of sight are calculated respectively according to a line-of-sight dataset, and the interval of the angle of the line of sight and the number of small intervals to be divided K are determined according to the maximum variation ranges.

Optionally, calculating the maximum variation range needs to exclude a few wild points that deviate far from the overall value, and the number of small intervals can be obtained by dividing a length of the interval of the angle by 3 degrees.

404, all division points are calculated by using an interval division point calculation function.

Optionally, when the interval of the angle is left-right symmetrical, a calculation function of division points is:

$$P_i = \text{sign}\,(i)\left(1 - \cos\left(i\frac{l_\theta}{K}\right)\right)\frac{\frac{l_\theta}{2}}{1 - \cos\left(\frac{l_\theta}{2}\right)}, \left(i = -\frac{K}{2}, -\frac{K}{2}+1, \ldots, \frac{K}{2}\right).$$

sign( ) is a sign function, and $l_\theta$ is a length of a symmetrical interval of the angle.

406, the interval of the angle is divided into K small intervals according to the division points.

Figure 5:
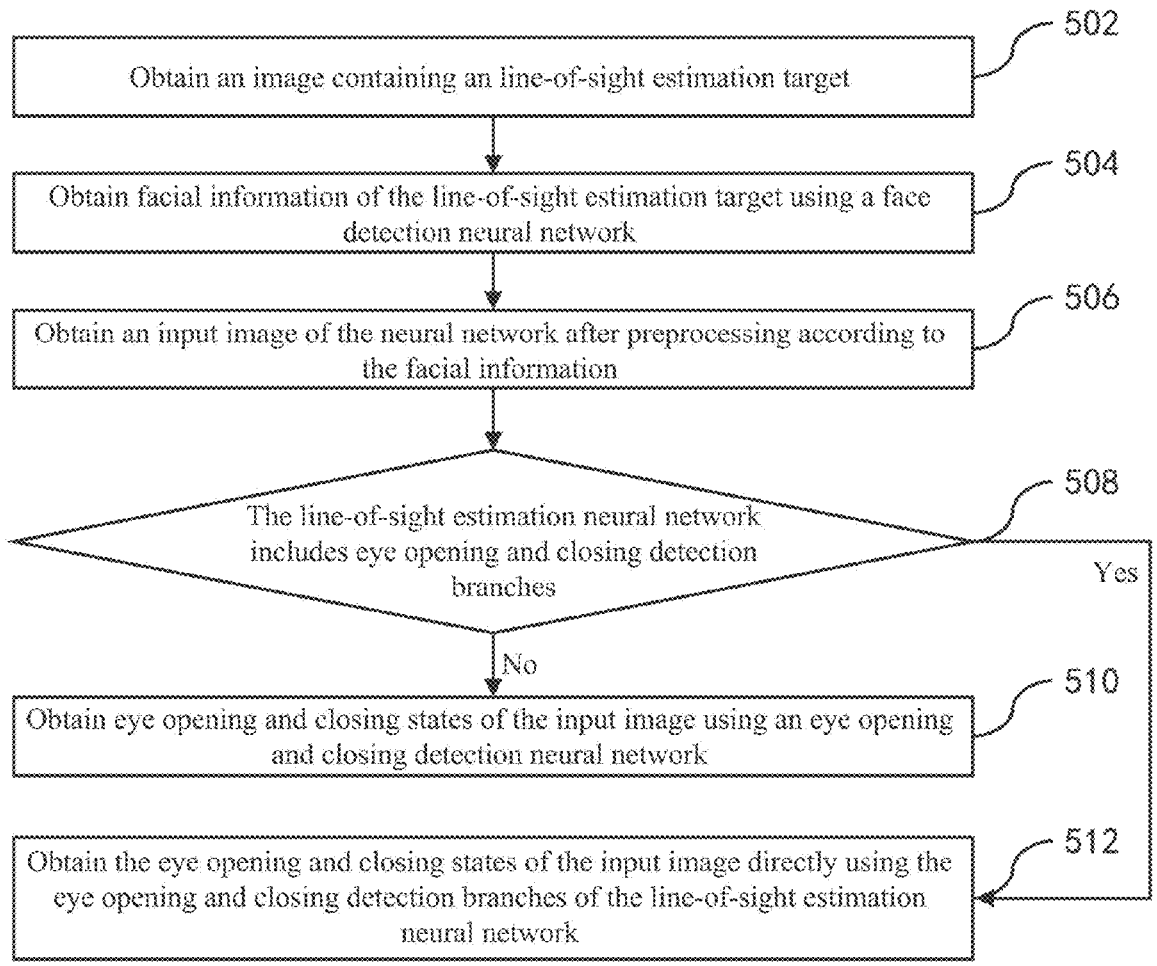
FIG. 5 is a flow chart of an embodiment of a method for detecting eye opening and closing states according to the present disclosure.

FIG. 5 is a flow chart of an embodiment of an eye opening and closing detection method according to the present disclosure. As shown in FIG. 5, the method includes the following steps.

502, an image containing an eye opening and closing detection target is obtained.

504, facial information of the target is obtained using a face detection neural network. The facial information includes the position of a target face in the image, the size of a cropping frame, and coordinates of key points on the face. The key points of the face include at least the corners of the eyes, the tip of the nose, and the corners of the mouth.

506, the image is preprocessed according to the facial information to obtain an input image of the neural network. The preprocessing includes the following operations.

An image containing the entire head of the target is cropped from the image containing the eye opening and closing detection target.

The cropped head image is rotated according to coordinates of the corners of the eyes or the corners of the mouth of the target, such that the corners of the eyes or the corners of the mouth of the target in the rotated image are on the same horizontal line.

A face image is cropped from the rotated head image according to the facial information, and the image is scaled and adjusted to the size required by the input of the neural network.

508, whether the line-of-sight estimation neural network includes eye opening and closing detection branches is determined.

510, if the line-of-sight estimation neural network does not include an eye opening and closing detection branch, eye opening and closing states of the input image are determined using a dedicated eye opening and closing detection neural network.

512, if the line-of-sight estimation neural network includes the eye opening and closing detection branches, the eye opening and closing states of the target are estimated directly using the line-of-sight estimation neural network.

Figure 6:
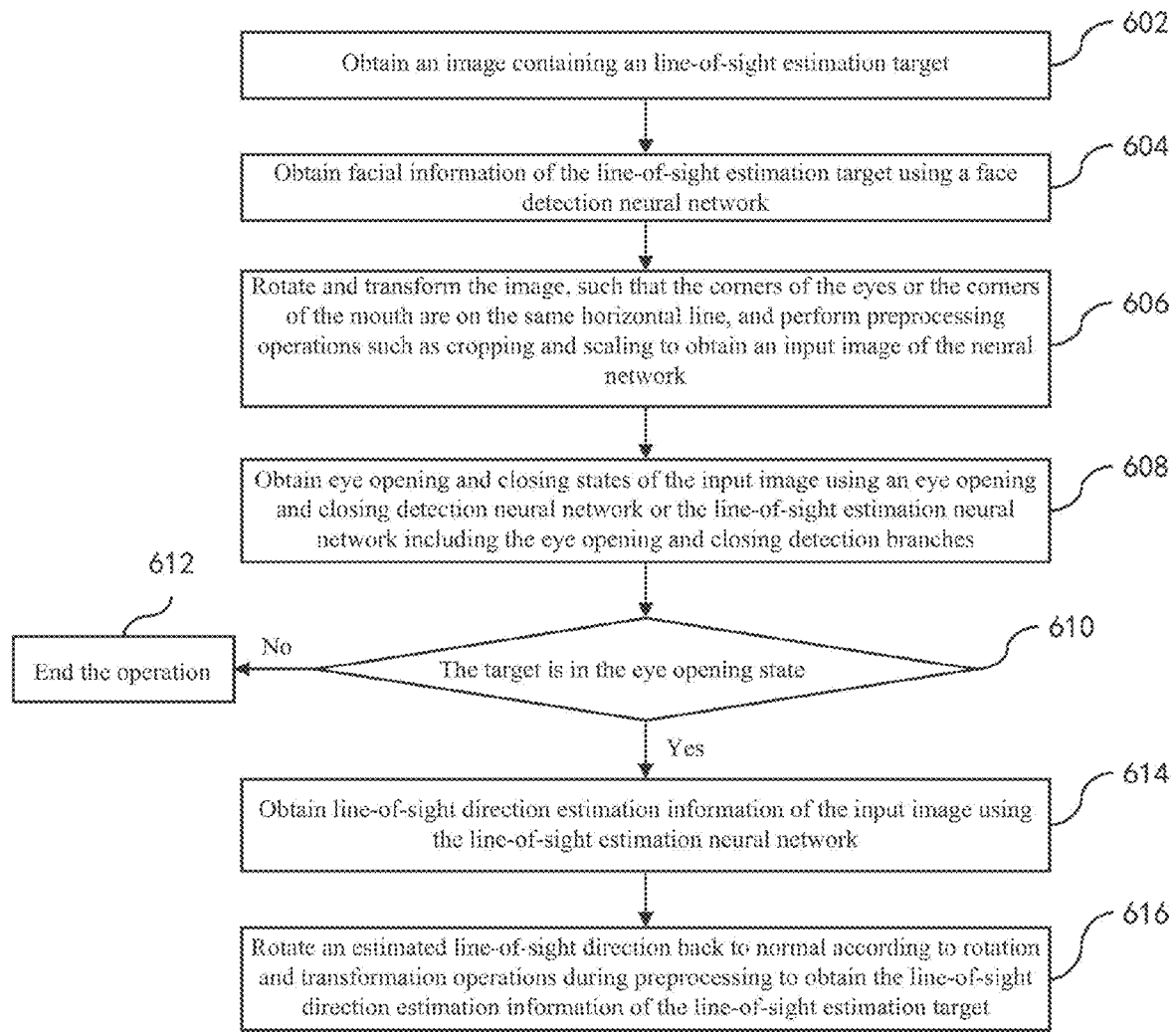
FIG. 6 is a flow chart of an embodiment of a line-of-sight estimation method according to the present disclosure.

FIG. 6 is a flow chart of an embodiment of a line-of-sight estimation method according to the present disclosure. As shown in FIG. 6, the method includes the following steps.

602, an image containing a line-of-sight estimation target is obtained.

604, the image is preprocessed according to facial information to obtain an input image of the neural network. The preprocessing includes the following operations.

An image containing the entire head of the target is cropped from the image containing the line-of-sight estimation target.

The cropped head image is rotated in a roll direction according to coordinates of the corners of the eyes or the corners of the mouth of the target, such that the corners of the eyes or the corners of the mouth of the target in the rotated image are on the same horizontal line. Rotation parameters of the image are recorded at the same time.

A face image is cropped from the rotated head image according to the facial information, and the image is scaled and adjusted to the size required by the input of the neural network.

606, the image is rotated and transformed, such that the corners of the eyes or the corners of the mouth are on the same horizontal line, and preprocessing operations such as cropping and scaling are performed to obtain an input image of the neural network.

608, eye opening and closing states of the input image are determined using a dedicated eye opening and closing detection neural network or the eye opening and closing detection branches of the line-of-sight estimation neural network.

610, whether the target is in the eye opening state is determined.

612, in response to the target being in the eye closing state, it is meaningless to perform line-of-sight estimation on the target, and the operation is directly ended.

614, in response to the target being in the eye opening state, line-of-sight direction estimation information of the input image is obtained using the line-of-sight estimation neural network. If the line-of-sight estimation neural network includes the eye opening and closing detection branches, the line-of-sight estimation information is already output while eye opening and closing detection is performed, and there is no need to make a second estimation.

According to rotation parameters of the image recorded during preprocessing, an estimated line-of-sight direction is rotated back to normal by a rotation matrix of a roll direction to obtain the line-of-sight direction estimation information of the line-of-sight estimation target.

Figure 7:
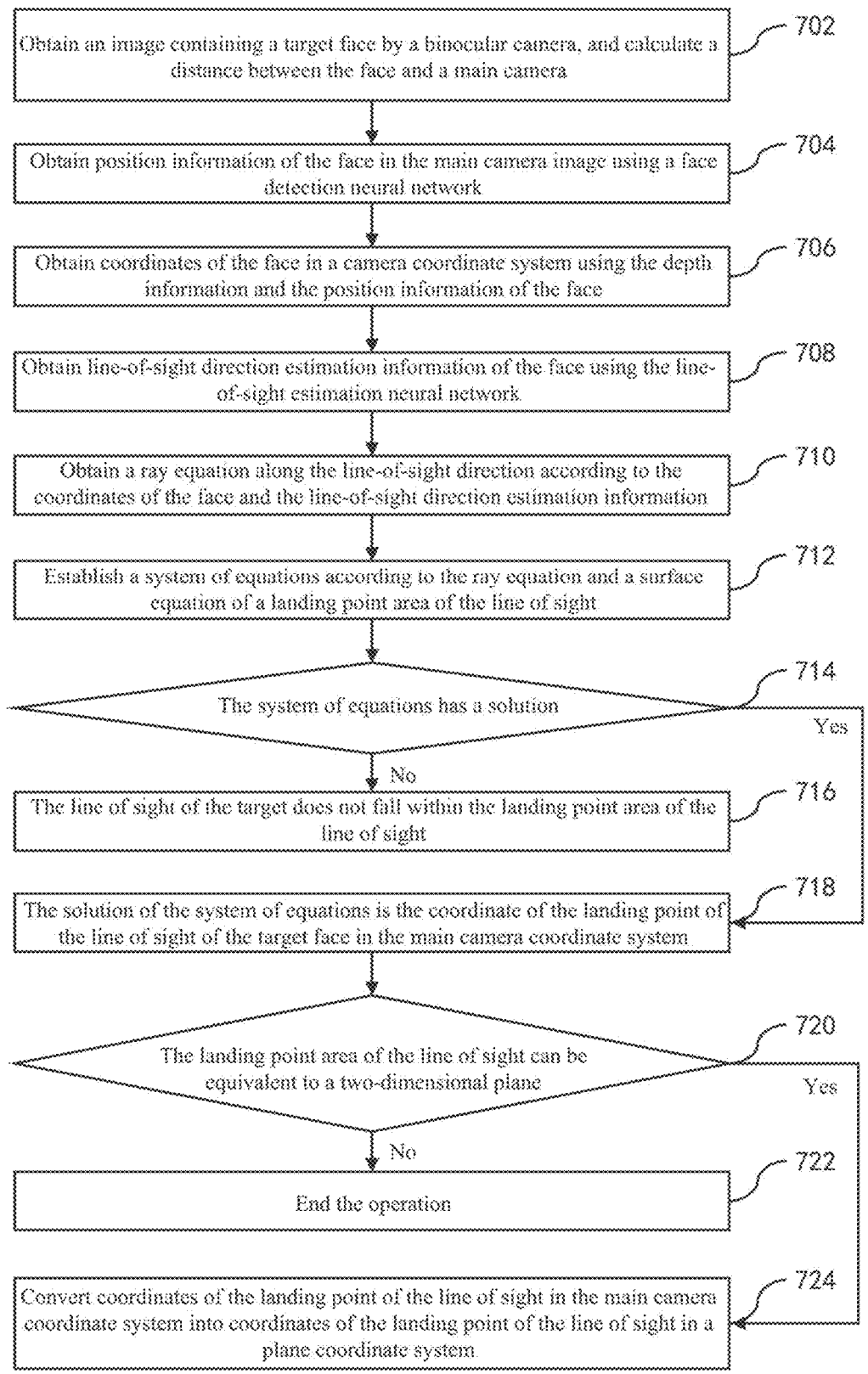
FIG. 7 is a flow chart of an embodiment of a method for solving a landing point of the line of sight according to the present disclosure.

FIG. 7 is a flow chart of an embodiment of a method for solving a landing point of the line of sight according to the present disclosure. As shown in FIG. 7, the method includes the following steps.

An image containing a target face is obtained by a binocular camera, and a distance between the face and a main camera, that is, depth information of the face, is calculated. The main camera is a fixed camera in the binocular camera.

Position information of the face in the main camera image is obtained using a face detection neural network.

Coordinates of the face in a camera coordinate system are obtained using the depth information and the position information of the face of the main camera image. The camera coordinate system is a space rectangular coordinate system established with reference to an optical center and axis of the main camera.

The coordinates of the face are obtained mainly based on a camera imaging principle. The coordinates of the face without depth in the camera coordinate system can be obtained by multiplying face pixel coordinates on an imaging plane by an inverse matrix of an internal reference matrix of the camera.

708, line-of-sight direction estimation information of the target is obtained using the line-of-sight estimation method as shown in FIG. 5.

710, a ray equation along the estimated line-of-sight direction is obtained according to the coordinates of the face in the camera coordinate system and a unit vector along the estimated line-of-sight direction.

712, a system of equations is established according to the ray equation and an attention surface equation.

714, whether the system of equations has a solution is calculated and determined.

716, if the system of equations has no solution, it means that the line of sight of the target does not fall within a landing point area of the line of sight.

718, if the system of equations has a solution, the solution of the system of equations is the coordinate of the landing point of the line of sight of the target in the camera coordinate system.

720, whether the landing point area of the line of sight can be equivalent to a two-dimensional plane is determined.

For example, blackboard planes, projection screens and flat-screen TVs can be directly regarded as two-dimensional planes. In addition, curved objects with regular curvature, such as curved monitors and curved mobile phone screens, can be flattened and equivalent to two-dimensional planes.

722, in response to a condition that the attention surface cannot be equivalent to a two-dimensional plane, the three-dimensional space coordinates of the landing point of the line of sight are used, and the operation is ended.

724, in response to a condition that the landing point area of the line of sight can be equivalent to a two-dimensional plane, coordinates of the landing point of the line of sight in the main camera coordinate system are converted into coordinates of the landing point of the line of sight in a plane coordinate system.

If the attention surface can be regarded as a two-dimensional plane, another space rectangular coordinate system can be established in the attention area. A coordinate rotation matrix and a coordinate translation matrix are obtained according to a rotation and translation relationship of the two space rectangular coordinate systems. The coordinates of the landing point of the line of sight in the camera coordinate system are converted into coordinates in the attention area coordinate system using the coordinate rotation matrix and the coordinate translation matrix. Finally, by rounding off the depth-related coordinates, two-dimensional coordinates of the landing point of the line of sight in the plane coordinate system of the attention area can be obtained.

Figure 8:
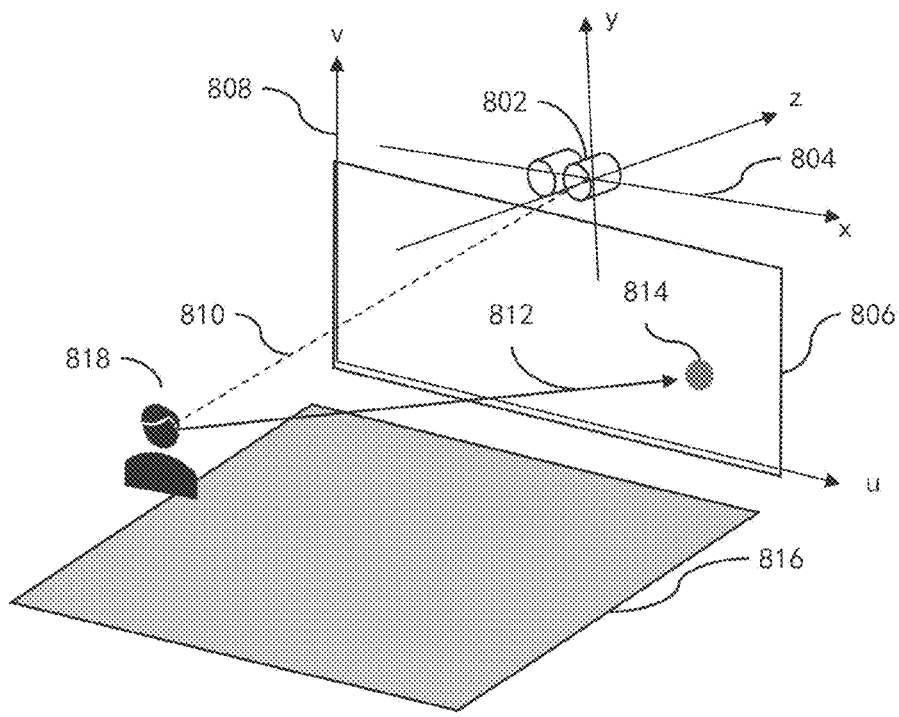
FIG. 8 is a schematic diagram of a spatial geometric relationship of the method for solving the landing point of the line of sight according to the present disclosure.

FIG. 8 is a schematic diagram of a spatial geometric relationship of the method for solving the landing point of the line of sight according to the present disclosure. Taking a classroom teaching environment as an example, as shown in FIG. 8, the spatial geometric relationship includes the following items.

802 is a binocular camera, installed above the wall where the classroom blackboard is located. The installation method and position do not need strict requirements, but the installation position and declination information need to be measured.

804 is a space rectangular coordinate system established with an optical center of a main camera of the binocular camera as an origin.

806 is a landing point area of the line of sight where the blackboard plane is located of the present embodiment.

808 is a rectangular plane coordinate system established with a blackboard plane as a reference, having a clear conversion relationship with the space rectangular coordinate system.

810 is a connecting line between an attention analysis object and the binocular camera, the length of which is the depth of the face.

812 is a ray along the line-of-sight direction of the attention analysis object.

814 is a landing point of the line of sight of the attention analysis object on the blackboard plane.

816 is a classroom ground reference plane.

818 is the attention analysis object.

Figure 9:
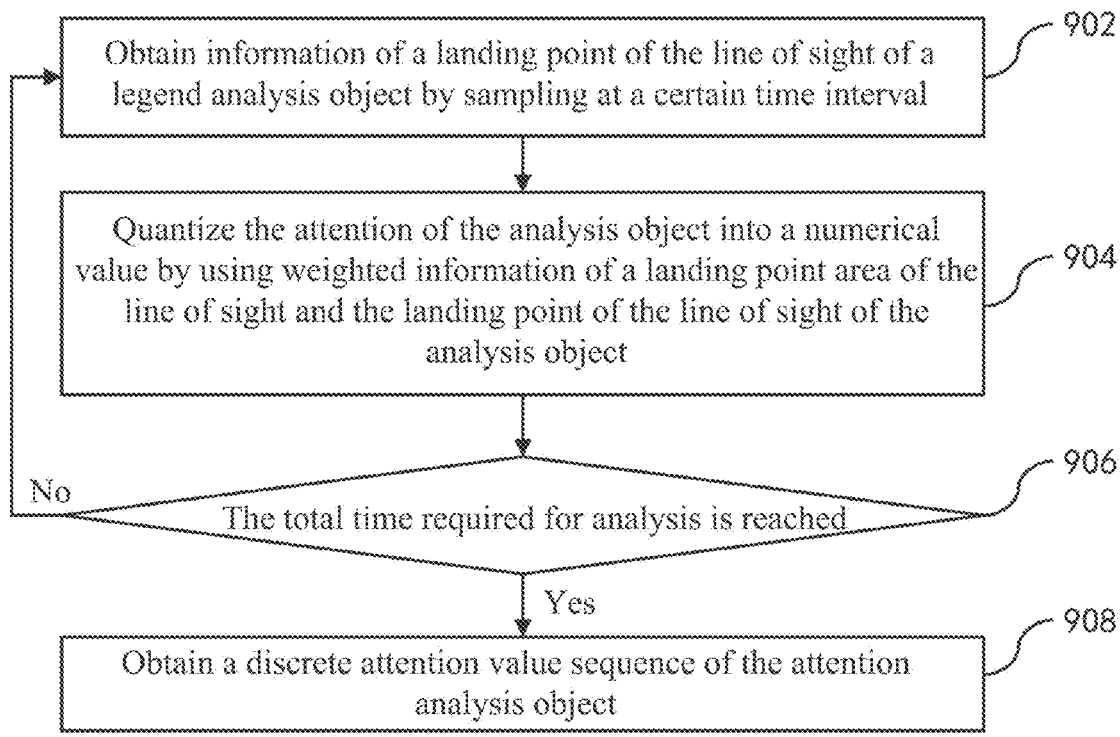
FIG. 9 is a flow chart of an embodiment of a quantitative method for attention based on the line of sight according to the present disclosure.

FIG. 9 is a flow chart of an embodiment of an attention analysis method according to the present disclosure. As shown in FIG. 9, the method includes the following steps.

902, information of a landing point of the line of sight of an attention analysis object is obtained by sampling at a certain time interval.

904, the attention of the analysis object is quantized into a numerical value by using weighted attention area information and the landing point of the line of sight of the analysis object.

The weighting operation is based on the degree of correlation between the attention area and classroom teaching. Taking a blackboard plane as an example, a higher weight is assigned to the part with blackboard writing, and a lower weight is assigned to the area without blackboard writing. In addition, higher weights should also be assigned to key areas emphasized by teachers with laser pointers or gestures.

906, whether the total time required for attention analysis is reached is determined. Generally speaking, the time for one class shall prevail.

If the total time for attention analysis is not reached, the method continues to repeat operations from 902 to 906.

908, if the total time for attention analysis has been reached, the attention analysis operation is ended, and an attention value sequence of the attention analysis object in discrete time is obtained.

Figure 10:
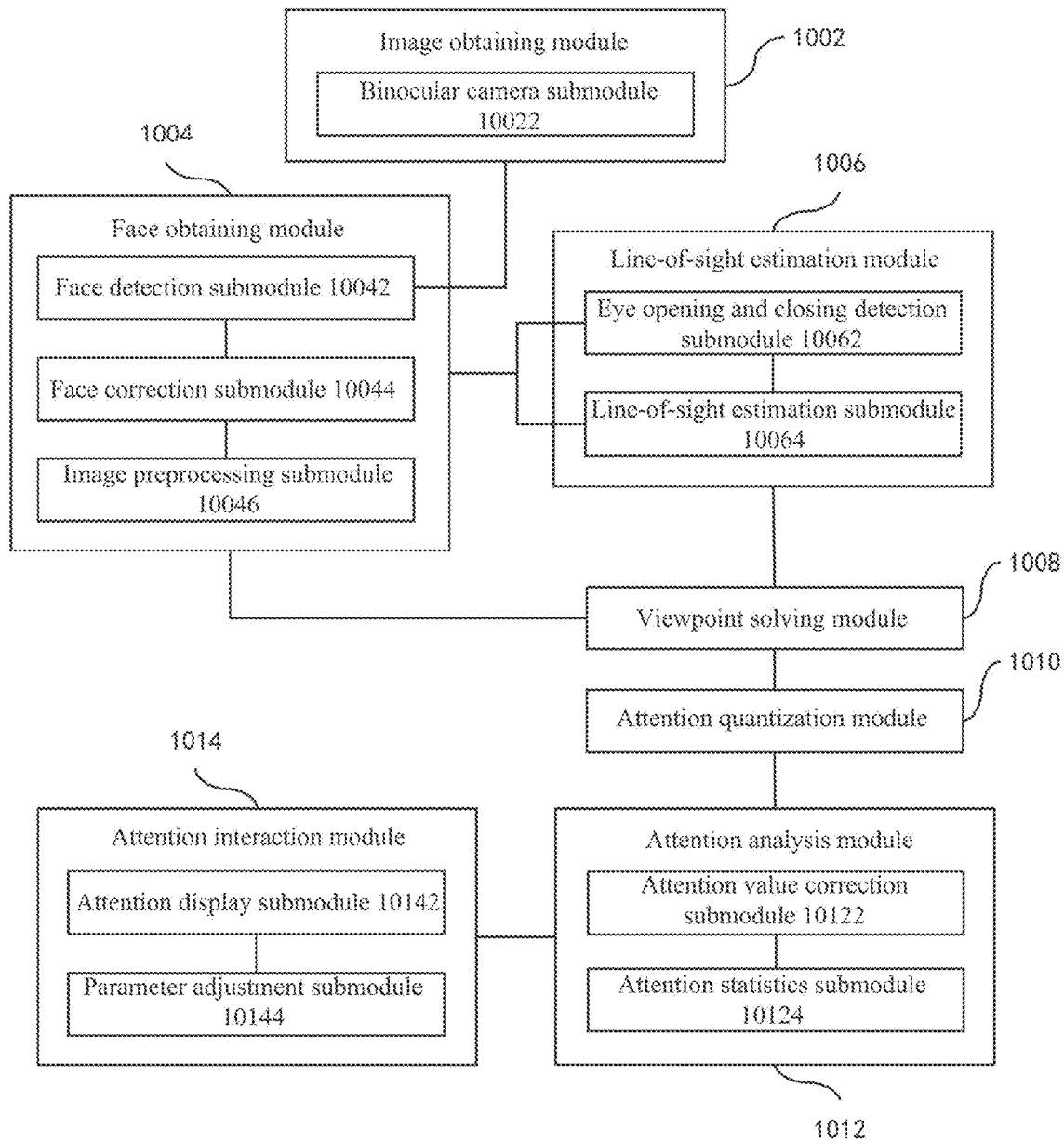
FIG. 10 is a structural diagram of an attention analysis system based on the line of sight according to the present disclosure.

FIG. 10 is a structural diagram of an embodiment of an attention analysis system according to the present disclosure. As shown in FIG. 10, the attention analysis system includes the following items.

1002 is an image obtaining module, configured to obtain an image of an attention analysis object. The obtained target image needs to contain depth information.

10022 is a binocular camera submodule, configured to shoot the binocular image of the attention analysis object.

1004 is a face obtaining module, configured to obtain a face input image of a specific specification of an eye opening and closing detection neural network and a line-of-sight estimation neural network.

10042 is a face detection submodule, configured to locate the face of the attention analysis object from the image obtained by the image obtaining module 1002, and obtain key point information of the face of the attention analysis object. A face detection neural network is included.

10044 is a face correction submodule, configured to rotate the left and right deflected face to a state where the corners of the eyes or the corners of the mouth are on the same horizontal line.

10046 is an image preprocessing submodule, configured to crop a face image with a specific position and aspect ratio from the rotated image, and then scale the cropped image to a specific size to obtain an input image required by the neural network. The specific position during cropping refers to the key point information of the face. Optionally, the geometric center of the quadrilateral formed by the corners of the eyes and the corners of the mouth is the center of the cropped image.

1006 is a line-of-sight estimation module, configured to estimate eye opening and closing states of the attention analysis object and the line-of-sight direction in a camera coordinate system.

10062 is an eye opening and closing detection submodule, configured to estimate whether the attention analysis object is in the eye opening state or eye closing state, so as to avoid errors caused by the eye closing state on the line-of-sight estimation and attention analysis.

10064 is a line-of-sight estimation submodule, configured to estimate the line-of-sight direction of the attention analysis object.

Optionally, 10062 and 10064 can be implemented by the line-of-sight estimation neural network including eye opening and closing detection branches, and this solution can reduce the total parameters of the neural network and improve the processing speed.

1008 is a viewpoint solving module, configured to calculate coordinates of a landing point of the line of sight of the attention analysis object.

1010 is an attention quantization module, configured to quantize the information of the landing point of the line of sight of the attention analysis object into attention numerical information.

1012 is an attention analysis module, configured to process and analyze an attention value sequence of the attention analysis target, and at the same time statistically analyze the attention value sequence of all the attention analysis objects, thereby correcting some errors and summarizing the attention information.

10122 is an attention value correction submodule, configured to correct excessively high or low errors in the attention value sequence of the attention analysis object. The errors may be caused by collectively writing with the head down, temporary recess and focusing on the speaker, etc.

10124 is an attention statistics submodule, configured to count the attention information of all the attention analysis objects.

1014 is an attention interaction module for interaction between the attention analysis system and a user.

10142 is an attention display submodule, configured to display attention analysis results to the user. The attention analysis results include attention information of a single attention analysis object and the overall situation of all the attention analysis objects summarized by 1012.

10144 is a parameter adjustment submodule of the attention analysis system, configured to adjust relevant parameters of the attention analysis system. The relevant parameters include: camera parameters of the binocular camera and a parameter of the information of the landing point area of the line of sight.

The camera parameters of the binocular camera in 10022 need to be modified after changing the camera or adjusting the installation position of the camera.

The parameter of the information of the landing point area of the line of sight in 1008 needs to be modified when modifying, deleting, adding and modifying the weight of the landing point area of the line of sight.

What is claimed is:

1. A quantitative method for attention based on a line-of-sight estimation neural network, comprising:
    step 1, calculating an attention area, wherein the attention area is an entire planar area requiring attention focusing of a target; fitting the attention area into one or more surfaces capable of being represented by equations, wherein the surfaces are called attention surfaces; and recording a mapping relationship between points on an actual object plane and the surfaces, wherein in the teaching field, the attention area is an entire teaching area comprising a blackboard, a platform, or multimedia;
    step 2, obtaining an image of a detection area using a binocular camera, and locating a position of each face using a face detection method, wherein each face is a target for calculation of the attention;
    step 3, correcting each target image and intercepting the target image;
    step 3.1, calculating positions of key points on the target face, wherein the key points comprise: corners of eyes, the tip of the nose, and corners of the mouth;
    step 3.2, correcting the target using key point information, such that the corners of the eyes or the corners of the mouth of the target are on the same horizontal line; and recording a rotation angle of the target; and
    step 3.3, rotating the image for each target, then intercepting the image of the target face, and scaling the intercepted image to a required size;
    step 4, detecting whether eyes of the target are open;
    step 5, calculating a line-of-sight direction of the target using the line-of-sight estimation neural network in response to the eyes of the target being open;
    step 6, calculating a landing point of the line of sight of the target;
    step 6.1, obtaining a positional relationship between an viewing angle area and the camera, and establishing a space rectangular coordinate system with a main camera in the binocular camera as a reference;
    step 6.2, according to the rotation angle of the target image recorded in step 3.2, rotating the line-of-sight direction of the target obtained in step 5 back to normal;
    step 6.3, according to a line-of-sight direction back to normal obtained in step 6.2, calculating yaw and pitch angles of the line of sight in the space rectangular coordinate system established in step 6.1;
    step 6.4, calculating a distance between the target and the main camera according to a binocular imaging principle, and then calculating coordinates of the target in the space rectangular coordinate system; and calculating an intersection of the line of sight and a viewing angle surface according to the coordinates and the angles of the line of sight in step 6.3; and
    step 6.5, mapping the intersection back to the point on the plane to obtain the landing point of the line of sight; and
    step 7, sampling the landing point of the line of sight for the target at multiple preset time intervals to obtain landing point information of the target; and performing weighting operation on the landing point information of the target based on a correlation degree of attention focusing required by the target in the attention area to obtain multiple weighted attention values, wherein the multiple weighted attention values form a quantized attention value sequence.

2. The quantitative method for attention based on a line-of-sight estimation neural network according to claim 1, wherein the line-of-sight estimation neural network in step 5 comprises:
    a feature extraction backbone network, a fully connected layer for small interval classification of the yaw angle, a fully connected layer for small interval classification of the pitch angle, a fully connected layer for yaw angle regression, a fully connected layer for pitch angle regression, and a fully connected layer for eye opening and closing detection branches; the feature extraction backbone network has an input of the target image, and an output of extracted features, and extracted features are respectively input to the fully connected layer for small interval classification of the yaw angle, the fully connected layer for small interval classification of the pitch angle, and the fully connected layer for eye opening and closing detection branches; outputs of the fully connected layer for small interval classification of the yaw angle, and the fully connected layer for small interval classification of the pitch angle are correspondingly input to the fully connected layer for yaw angle regression and the fully connected layer for pitch angle regression; and outputs of the fully connected layer for yaw angle regression, the fully connected layer for pitch angle regression, and the fully connected layer for eye opening and closing detection branches are respectively an estimated yaw angle, an estimated pitch angle, and eye opening and closing detection results.

3. The quantitative method for attention based on a line-of-sight estimation neural network according to claim 2, wherein in the line-of-sight estimation neural network, each unit in the fully connected layer for yaw angle regression represents a small interval of the angle after yaw angle division, and each unit in the fully connected layer for pitch angle regression represents a small interval of the angle after pitch angle division; and a method for the division is as follows: making the small intervals denser when the rotation angle of the line of sight is smaller, and making the small intervals sparser when the rotation angle of the line of sight is larger.

4. The quantitative method for attention based on a line-of-sight estimation neural network according to claim 2, wherein a method for training the line-of-sight estimation neural network comprises the following steps:

step 202, freezing weight parameters of the fully connected layer for yaw angle regression and the fully connected layer for pitch angle regression in the line-of-sight estimation neural network, such that these weight parameters are not updated and adjusted during network training, and the line-of-sight estimation neural network enters a classification training state;

step 204, obtaining line-of-sight direction estimation information of each sample image in a line-of-sight dataset using the line-of-sight estimation neural network in the classification training state;

step 206, calculating a classification loss part and a regression loss part according to the line-of-sight direction estimation information and line-of-sight direction annotation information, and calculating a line-of-sight estimation loss function value by weighting a loss function;

step 208, since the line-of-sight dataset is divided into a training part and a verification part with no intersection with the training part, estimating images in the verification part in the dataset using the line-of-sight estimation neural network in the classification training state, and calculating performance parameters of the line-of-sight estimation neural network using the corresponding annotation information;

step 210, determining whether the line-of-sight estimation neural network meets performance requirements of a first training stage, if not, proceeding to step 212, and if yes, proceeding to step 214;

step 212, updating and adjusting unfrozen weight parameters of the line-of-sight estimation neural network according to the line-of-sight estimation loss function value, and continuing to return to step 204 for iterative operations;

step 214, adjusting an anchor point value of the small interval of the angle, wherein values of the weight parameters of the fully connected layer for yaw angle regression and the fully connected layer for pitch angle regression are the anchor point values of the corresponding small interval of the angle, and an initialization anchor point value is a median value of each small interval of the angle of the line of sight; and freezing all weight parameters other than the weight parameters of the fully connected layer for small interval classification of the yaw angle, the fully connected layer for small interval classification of the pitch angle, the fully connected layer for yaw angle regression, and the fully connected layer for pitch angle regression, such that the line-of-sight estimation neural network enters a regression training state;

step 216, obtaining line-of-sight direction estimation information of each sample image in the line-of-sight dataset using the line-of-sight estimation neural network in the regression training state, wherein the line-of-sight direction estimation information contains classification estimation information and estimated angle outputs of the small intervals of the yaw and pitch angles of the line of sight;

step 218, calculating a classification loss part and a regression loss part according to the line-of-sight direction estimation information and line-of-sight direction annotation information, and calculating a line-of-sight estimation loss function value by weighting a loss function;

step 220, estimating images in the verification part in the dataset using the line-of-sight estimation neural network in the regression training state, and calculating performance parameters of the line-of-sight estimation neural network using the corresponding annotation information;

step 222, determining whether the line-of-sight estimation neural network meets performance requirements of a second training stage, if not, proceeding to step 224, and if yes, proceeding to step 226;

step 224, updating and adjusting the unfrozen weight parameters of the line-of-sight estimation neural network according to the line-of-sight estimation loss function value, and continuing to return to step 216 for iterative operations; and step 226, ending supervised training of the line-of-sight estimation neural network.

5. The quantitative method for attention based on a line-of-sight estimation neural network according to claim 3, wherein the small interval division is symmetrical division, and a calculation function of division points is:

$$P_i = \text{sign}(i)\left(1 - \cos\left(i\frac{l_\theta}{K}\right)\right)\frac{\frac{l_\theta}{2}}{1 - \cos\left(\frac{l_\theta}{2}\right)}, \left(i = -\frac{K}{2}, -\frac{K}{2}+1, \ldots, \frac{K}{2}\right).$$

$P_i$ represents a position of a i-th division point, sign( ) is a sign function, $l_\theta$ is a length of a symmetrical interval of the rotation angle, and K represents a number of the small intervals.

6. The quantitative method for attention based on a line-of-sight estimation neural network according to claim 4, comprising further training the line-of-sight estimation neural network in the following steps:

step 302, dividing the line-of-sight estimation dataset into a plurality of small datasets with no intersection, wherein a non-intersection means that any two small datasets do not contain the same element;

step 304, taking a small dataset, wherein the small dataset contains a training part and a testing part; and recording the weight parameters of the line-of-sight estimation neural network as $\Phi$, expressing the line-of-sight estimation neural network as $M_\Phi$, and duplicating $M_\Phi$ to obtain a duplicated line-of-sight estimation neural network $M_\Theta$, wherein $\Theta=\Phi$;

step 306, sampling at least one sample image from the training part of the small dataset, and obtaining line-of-sight direction estimation information of the sample using the duplicated line-of-sight estimation neural network $M_\Theta$;

step 308, calculating a line-of-sight estimation loss function value according to the line-of-sight direction estimation information and corresponding line-of-sight annotation information;

step 310, training and adjusting weight parameters Θ of the duplicated line-of-sight estimation neural network based on the line-of-sight estimation loss function value;

step 312, determining whether specified training times conditions are reached, if not, returning to step 306, and if yes, executing step 314;

step 314, recording the line-of-sight estimation neural network trained and adjusted by an inner training cycle as $M_{\Theta'}$, sampling at least one sample image from the testing part of the small dataset, and obtaining line-of-sight direction estimation information of the sample using $M_{\Theta'}$;

step 316, calculating a line-of-sight estimation loss function value according to the line-of-sight direction estimation information and corresponding line-of-sight annotation information;

step 318, training and adjusting the weight parameters Φ of the duplicated line-of-sight estimation neural network $M_\Phi$ based on the line-of-sight estimation loss function value;

step 320, determining whether performance of the line-of-sight estimation neural network meets ending conditions of few-sample learning and training, if not, returning to step 304, and if yes, proceeding to step 322; and step 322, ending the few-sample training of the line-of-sight estimation neural network.

\* \* \* \* \*